United States Patent [19]

Ejiri

[11] Patent Number: 5,182,708
[45] Date of Patent: Jan. 26, 1993

[54] METHOD AND APPARATUS FOR CLASSIFYING TEXT

[75] Inventor: Koichi Ejiri, Santa Clara, Calif.

[73] Assignees: Ricoh Corporation, Menlo Park, Calif.; Ricoh Co. Ltd., Tokyo, Japan

[21] Appl. No.: 764,790

[22] Filed: Sep. 24, 1991

Related U.S. Application Data

[63] Continuation-in-part of Ser. No. 626,642, Dec. 11, 1990, abandoned.

[51] Int. Cl.⁵ .............................................. G06F 15/38
[52] U.S. Cl. .................................................... 364/419
[58] Field of Search ................ 364/419, 200 MS File, 364/900 MS File; 381/43, 41, ; 395/600

[56] References Cited

U.S. PATENT DOCUMENTS

4,580,241  4/1985  McKucera ........................... 364/419
4,888,730  12/1989  McRae et al. ........................ 364/419

OTHER PUBLICATIONS

Booth, A. D.; *A Law of Occurrences for Words of Low Frequency* Information and Control, 10(4); pp. 386-393 (1967).
Kennedy, J.; Neville, A,; *Basic Statistical Method for Engineers and Scientists* pp. 407-416, Harper and Row Publishers, Inc. (1986).
Mitzutani, S.; *Lecture on Japanese*, Asakura, Tokyo, 1983.
Tankard, J.; *The Literary Detective* Byte, Feb. 1986, pp. 231-238.
Zipf, G. K.; *The Psycho-biology of Language* The MIT-Press (1965), Originally Printed by Houghton Mifflin Co. 1935, pp. 20-48.
Nicolis, J.; *Dynamics of Hierachical Systems* Springer-Verlag, Berlin 1956, pp. 344-359.
Hormann, H.; *Psycholinguistics* 2nd Ed. Rev., Springer-Verlag, pp. 88-92, 1979.
Mandelbrot, B. B.; *Fractal Geometry of Nature*, W. H. Freeman and Co., pp. 344-348, New York 1982.

*Primary Examiner*—Roy N. Envall, Jr.
*Assistant Examiner*—Khai Tran
*Attorney, Agent, or Firm*—Heller, Ehrman, White and McAuliffe

[57] ABSTRACT

The present invention provides a method and apparatus for classifying text by using two constants determined by analyzing the text. The first constant, G, classifies text in the order of constraint. It is defined by the equation $G = \log(N/L)/\{\log(N)-1\}$, where N is the number of words and L is the number of different words in the text being classified. The second constant, R, is the correlation coefficient between the word length and the logarithm scaled rank order of word frequency. The values of the two constants can be used to determine how to classify text. In the case of English text, the text may be classified as computer language, text from a technical manual, English text written by foreigners or English text written by native English speakers.

11 Claims, 9 Drawing Sheets

GENERAL FLOW CHART
SEE FIG. 6B

SEE FIG. 6A (8) SORTING
    HIST(Wi) INTO HIST ORDER(Wj)

(9) FOR ALL THE HIST ORDER(Wj) >= 3
    SX = SX + S LENGTH(Wj)
    SXX = SXX + S LENGTH(Wj) ** 2
    Y = 10*log(HIST ORDER(Wj))
    SY = SY + Y
    SYY = SYY + Y ** 2
    SXY = SXY + Y * S LENGTH(Wj)
    N SAMPLE = N SAMPLE + 1

(10) DEFINITION
    SSX = SX * SX
    SSY = SY * SY $$R = \frac{(SXY - SX*SY/N\ SAMPLE)}{SQRT\{(SXX - SSX/N\ SAMPLE)*(SYY - SSY/N\ SAMPLE)\}}$$

(11) TEXT CLASSIFICATION BY
    R AND G

END

FIG. 6B

METHOD AND APPARATUS FOR CLASSIFYING TEXT

CROSS-REFERENCE TO RELATED APPLICATION

The present application is a continuation-in-part of U.S. pending application Ser. No. 07/626,642, filed Dec. 11, 1990, now abandoned entitled Text Classification Method and Apparatus and priority is claimed thereunder.

BACKGROUND OF THE INVENTION

The present invention relates to a text classification method and apparatus.

Many teams are working hard to establish a natural language technology for various business applications. But no system can understand English text so that even simple parsing is not reliable.

But if the target text is well constrained, it is not difficult to parse it and understand its content. A good example is a computer language which is fully parsed and understood by a computer. Another example is the troubleshooting knowledge written in short English form. The problems for a copier are well categorized and its recommendations are expressed as:

CATEGORY; Image Quality
PROBLEM; Image is Reduced
RECOMMENDATION;
(1) Check Optical System
(2) Check/replace ROM This is not difficult for parsing and interpreting by computer. Of course, even with this simple example, the English Understanding System requires a large vocabulary dictionary and grammar knowledge, which is different depending on the application.

Although it is almost impossible for a computer to understand the text written by human beings, the classification of the English text is very helpful for text retrieval, which will reduce the searching area.

There are some known technologies to identify the author of the text [Tankard]. But no description of text classification has been available.

As mentioned above, it is important to classify the English text by simple algorithm. The traditional approach which has a large vocabulary dictionary and grammar may provide classified text after appropriate processing. But this approach is too complex, and so is not appropriate for quickly searching for a large body of text.

SUMMARY OF THE INVENTION

It is an object of the present invention to provide a text classification method and apparatus. As mentioned above, it is important to classify the English text by a simple algorithm. The traditional approach, which has a large vocabulary dictionary and grammar, may provide classified text after appropriate processing, but it is very complex and not appropriate for quick search for a large body of text. Briefly, in one preferred embodiment, the present invention is a text classification method (and corresponding apparatus) for use in a text classification system having first, second and third counts. The method comprises the steps of storing a predetermined word list of text, isolating incoming text and incrementing the first count for each word. The method further includes the steps of comparing the incoming text with the predetermined stored text to determine if one or more of the incoming words matches with a predetermined stored word, and adding the incoming word to the stored list of there is no comparison, and incrementing the second count. The method also includes the steps of comparing a matching incoming word with a second, predetermined word list, and if matched, incrementing the third count, determining a first constant by the ratio of the first count to the second count and determining a second constant by a ratio of the third count to the first count, and finally determining the text classification by the value of the first an second constants.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIGS. 6(a) and 6(b) depicts the block diagram of the system in which the incoming message are interpreted as ASCII strings, then processed by CPU. The result is shown in the display.

THEORETICAL DISCUSSION OF THE INVENTION

To investigate the possibility to know the text's attribute, we made a following statistical experiment. Frequency of word or n-gram have been used as a clue to identify an author or a language. There are software packages available in the market for this purpose [Tankard]. In 1935, Zipf introduced the unique formula which could express the tendency of word frequency regardless of language [Zipf]. According to him the frequency of a word, f, and rank order of the word, r, were expressed as;

$$f^*r = \text{constant}.$$

Here, rank order means that word is ordered by its frequency, i.e. the highest frequency word comes first then the second largest frequency word is followed. This order is called rank order of the word. Mizutani [Mizutani] made a comment that this formula had been discovered by both J. B. Estoup (1916) and E. V. Condon (1926), independently. In his book, Mizutani proposed a new formula;

$$K = L^*f/(a^*f + N^*b) \tag{1}$$

where
- K; total number of different words whose frequencies are less than f,
- L; total number of different words,
- f; frequency of a word,
- N; total number of words,
- a, b; constants.

This can be modified into $$y = f/K = c^*f + d. \tag{2}$$

Here, 'K' is the number of different words less than the frequency 'f'; 'c' and 'd' are constants. It is easily understood that expression (2) represents the linear relation between 'f' and 'f/K'. Mizutani reported [Mizutani] that the relation (2) is valid for various languages, including Japanese, English and European languages.

EXPERIMENTS

We start from the following Zipf's second law;

$$k^*(f^*f) = \text{constant} \tag{3}$$

where, k is the number of the words which have the same frequency value 'f'. For simplicity, every different spelling is classified as an independent word; i.e. plural form of noun, verb inflection or mis-spelled words are classified as different words. The test was carried on for the various kind of text including computer languages. Two kind of expressions, (2) and (3), are plotted in FIG. 1 and FIG. 2, respectively. From the observation, it is obvious that Mizutani's expression is more powerful; 'y' and 'f' are approximated with linear lines. Because of this reason, only the Mizutani's expression will be used, hereafter.

Figure 1:
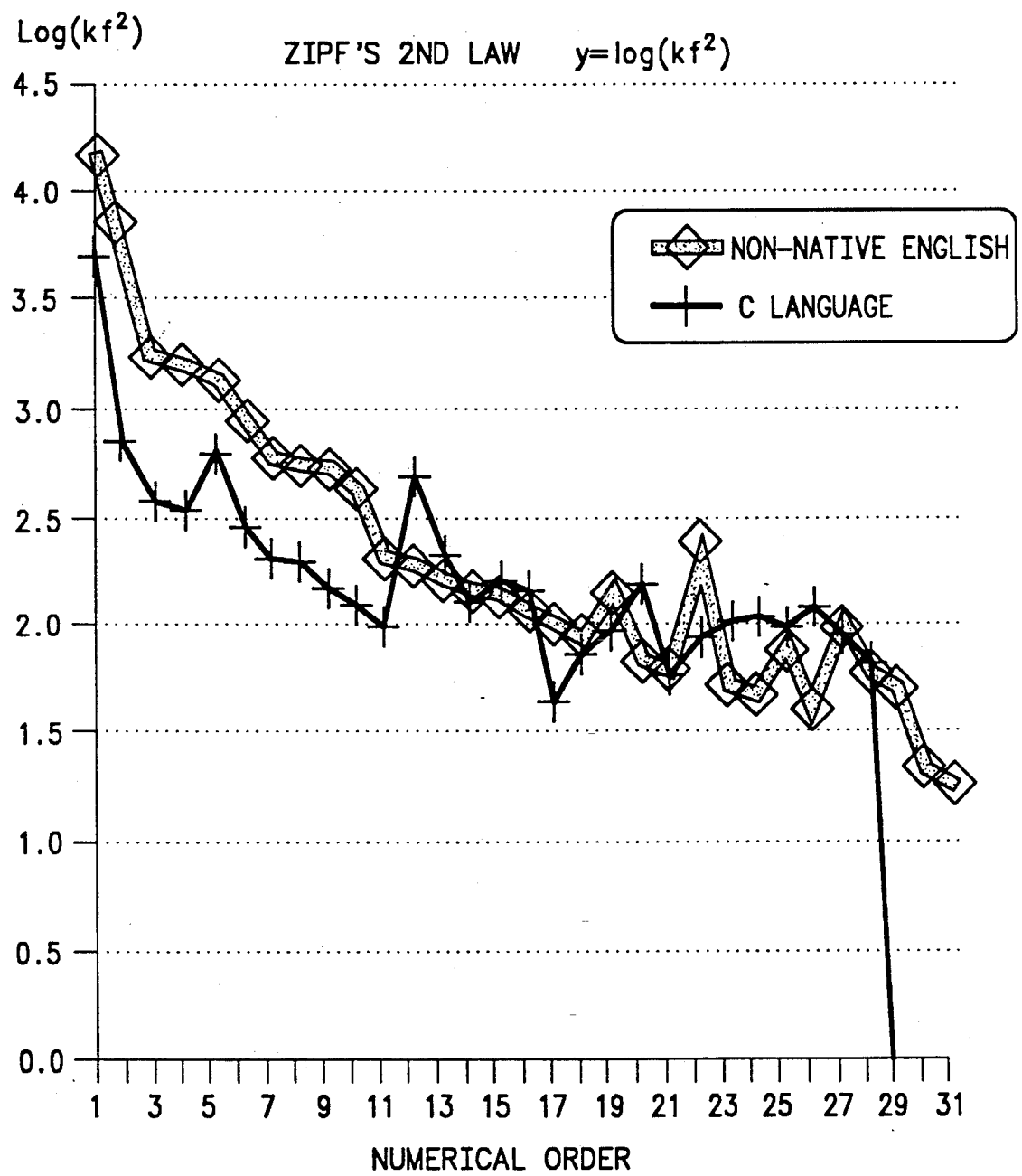
FIG. 1 depicts an application of Zipf's second law, $y = \log(k*f**2)$ to non-native English and c-language code. Zipf's law predict that the graphs should be flat.
Figure 2:
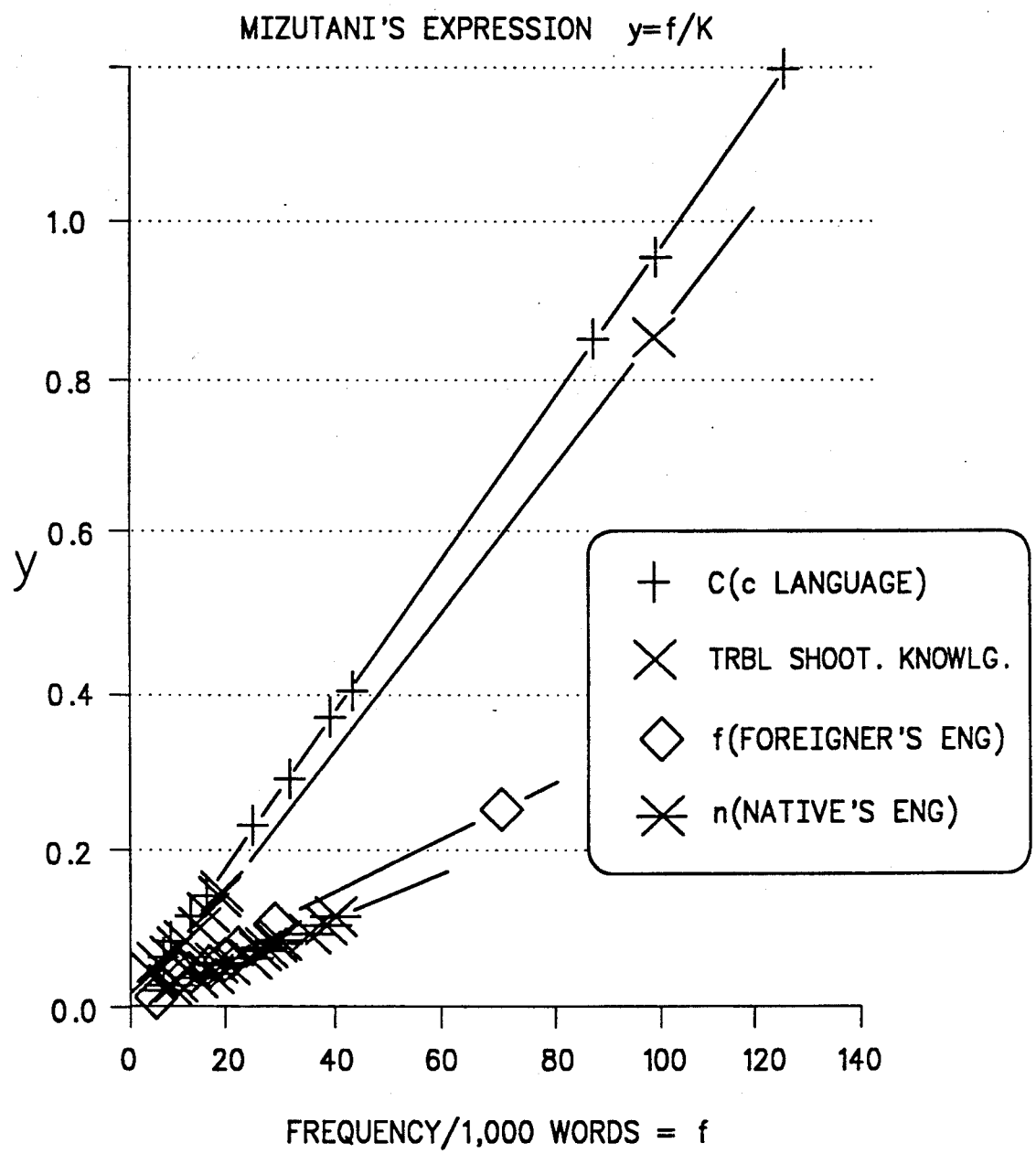
FIG. 2 depicts an application of Mizutani expression to c-language, trouble shooting knowledge description, foreigner's English and natives English.
Figure 3:
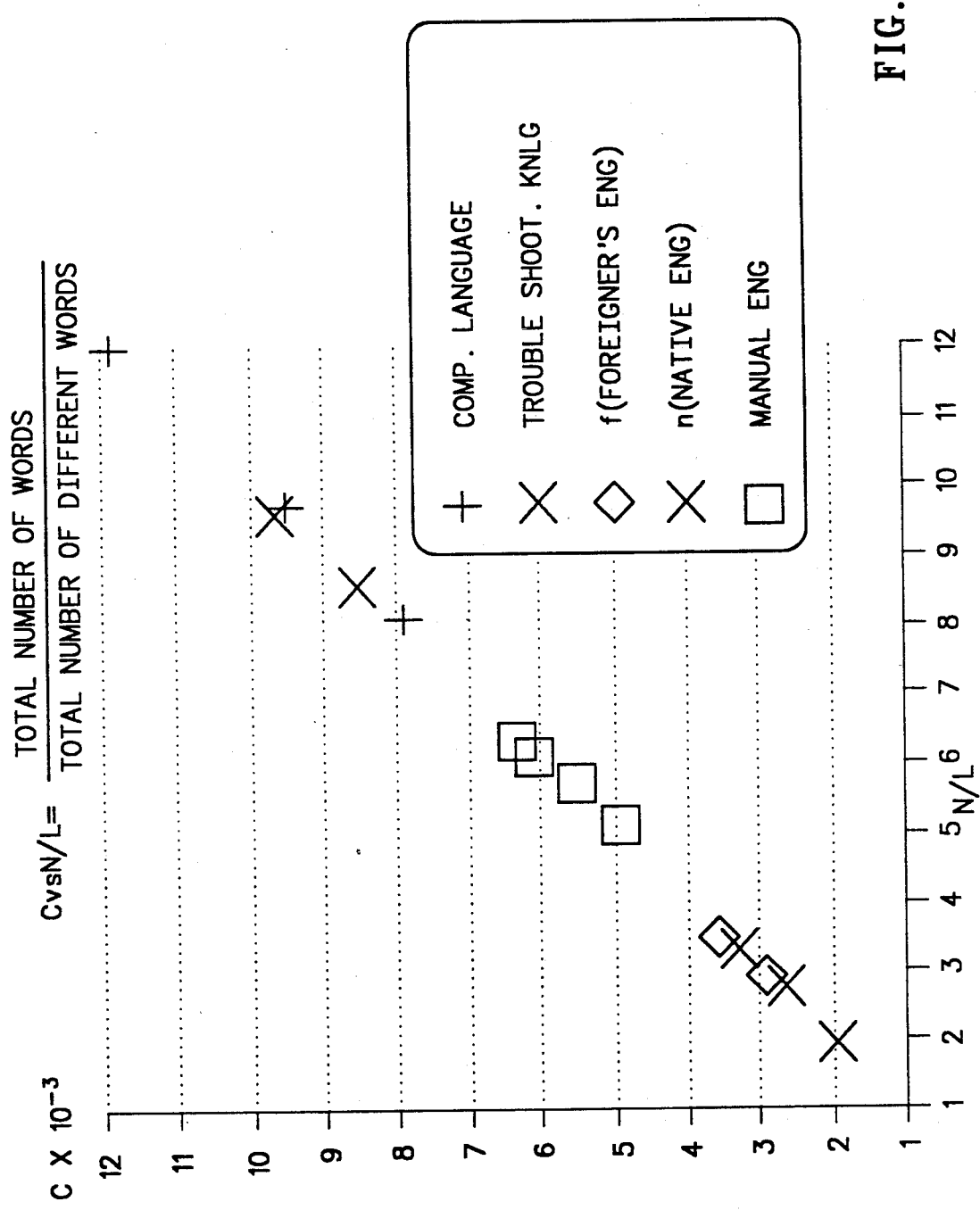
FIG. 3 depicts Mizutani coefficient 'c' (equation 4) versus ,N/L, for c-language, trouble shooting knowledge description, native's English and foreigner's English. The plotting shows that both parameters well correlate each other. Table-5 includes exact values.

Data in both FIG. 1, FIG. 2 and FIG. 3 are obtained from the following different texts, where;
- (c): computer language, C or Fortran source code (graphic symbol(G.S.) = +)
- (t): trouble shooting knowledge description for a facsimile (G.S. = x)
- (f): English text written by foreigners (G.S. = ◊)
- (n): English written by natives (G.S. = *)
- (m): Manual for computer software (G.S. = □)

In FIG. 2, 'frequency' was normalized for 1,000 sampled words. The line in this figure is determined from the linear regression approximation:

$$y = c^*f + d$$

where, $$d = \frac{\Sigma f_i^2 \Sigma y_i - \Sigma f_i \Sigma f_i^* y_i}{n^* \Sigma f_i^* f_i - (\Sigma f_i)^2} \tag{4}$$

$$c = \frac{n^* \Sigma f_i^* y_i - \Sigma f_i \Sigma y_i}{n^* \Sigma f_i^* f_i - (\Sigma f_i)^2} \tag{5}$$

Another finding from this graph is that the steepness, 'c' in expression (2) of those lines are strongly correlated to the constraint of the languages. Because, the texts above are roughly placed in the constraint order, (c) > (r) > (f) > (n). Although constraint does not have a clear definition, we can possibly define the constraint as the largeness of the world which is to be represented by the text; small vocabulary is enough for a small world.

In Tables 1, 2, 3, 4 major part of the histogram is shown, with the constraint measure to be defined later. Tables 1, 2, 3 and 4.

FIG. 3 shows values of 'c' versus 'N/L' for various kind of texts. The value 'c' was determined by linear regression formula (4) and (5), by the values whose 'normalized frequency' is greater than or equal to 3.0. In FIG. 3, it is very clear that 'c' is proportional to N/L, the ratio between number of words and number of different words in a text.

We define a 'word' as follows;
1) A different character string is a different word,
2) a word is a character string between the dividers defined below:

| <Dividers> | | |
|---|---|---|
| (space) | , | / |
| ( | ) | ! |
| @ | : | = |
| ; | [ | ] |
| * | % | + |
| { | } | & |
| # | \| | < |
| > | – | : |
| " | . | ? |
| (EOL) | (CR) | |

Here, (EOL) and (CR) are "end of line" and "carriage return", respectively.

DISCUSSIONS

Examining the FIG. 2, we can observe the following phenomena;
(a). High constrained language, like C-language, tends to have a large 'c' value compared to the less constrained English.
(b). A common English text by natives has the lowest 'c' value.

From FIG. 2, 'y' is proportional to 'f'. That means that 'd' = 0 using the expression (2). Comparing the two expression (1) and (2), we have the following relations;

$$c \sim = a/L$$

From the expression (2)

$$y \sim = f/K = (a/K)*f.$$

When $K \sim = L$, (dominant words in the histogram)

$$a \sim = 1.$$

That means $$\text{STEEPNESS } (=c) \sim = a/L \sim = 1/L. \quad (6)$$

It should be remembered that in this experiment 'c' is determined for 1,000 sampled words; $N=1,000$. Therefore, from expression (6), $$c \times 1000 \stackrel{.}{=} N/L. \quad (7)$$

To test this assumption, 'c' is plotted against N/L in FIG. 3. In spite of this approximate derivation, it is clear that 'c' is well approximated by 'N/L'(=the ratio between total number of words and number of different words). More clear evidence is shown in Table-5. Table 5. According to Booth [Booth], a more generalized Zipf's law can be expressed as $$L = (\text{const}^*N)^{1/g}, (g>0) \quad (8)$$

Here, L is the number of different words when sampled words are 'N', and 'g' is a constant.

From (8), $$N/L = \text{const}^*N^{(1-1/g)}$$

Then, the expression (8) is modified into $$\log\left(\frac{N}{L}\right) = \left(1 - \frac{1}{g}\right)\log N + \text{const}. \quad (9)$$

Figure 4:
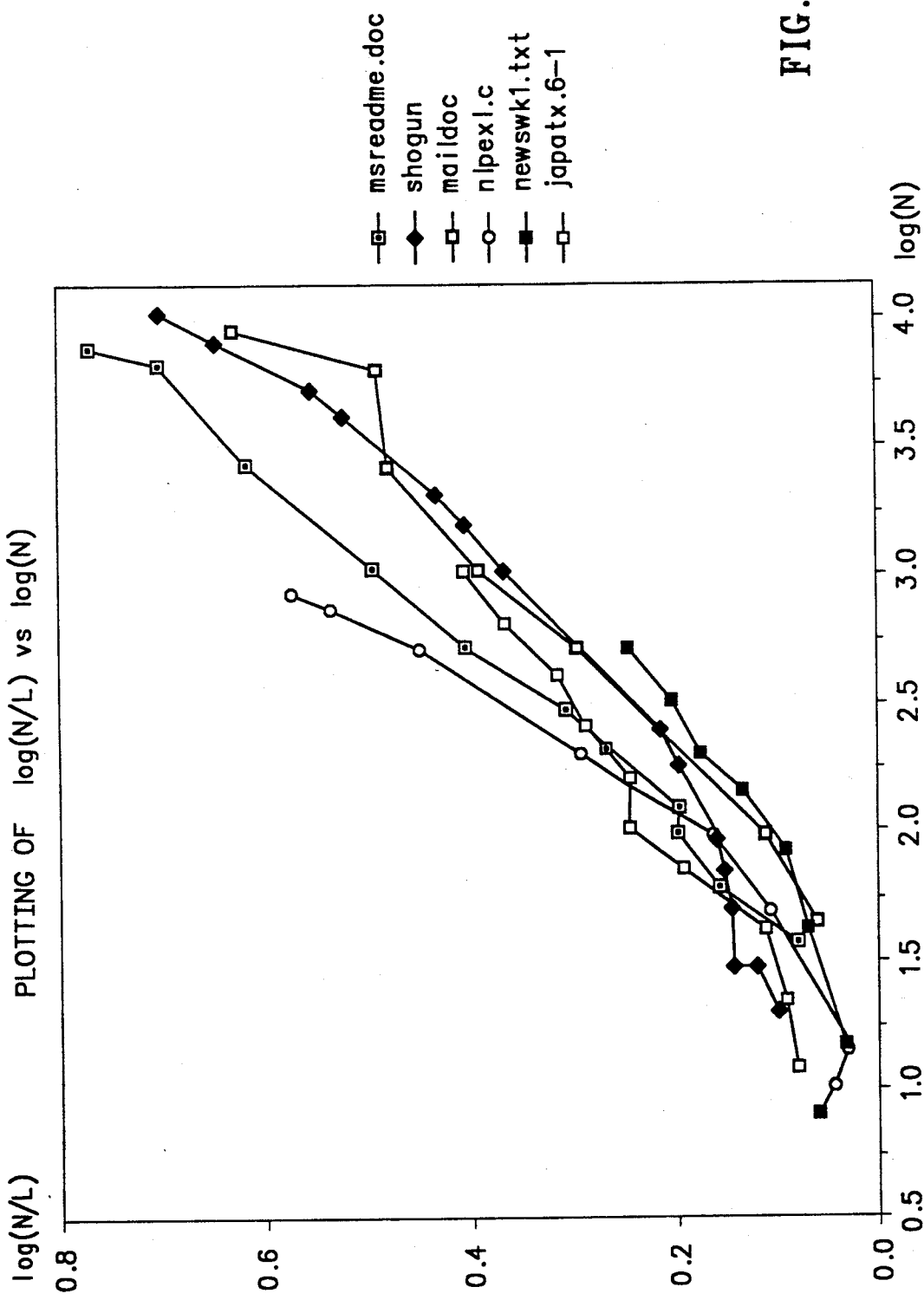
FIG. 4 depicts $\log(N/L)$, N=total number of different word and L=total number of words, as function of $\log(N)$. Used texts are; msreadme.doc=Microsoft on-line document for c compiler; shogun=novel 'Shogun' by J. Clavell; maildoc=33 e-mail documents 'IBM PC digest'; nlpexl.c=c code for natural language processing; newswk1.txt=Newsweek article.

Equation (9) shows that log(N/L) is proportional to log(N) after shifting by some constant. The plot of log(N/L) and log(N) (FIG. 4) suggests that the expression (9) is better expressed as;

$$\log(N/L) = \text{const}^*(\log(N) - C1), \quad (10)$$

where $C1 \sim = 1.0$.

That is;

$$G = \frac{\log(N/L)}{\log(N) - 1} \sim = \text{constant}. \quad (11)$$

Figure 5:
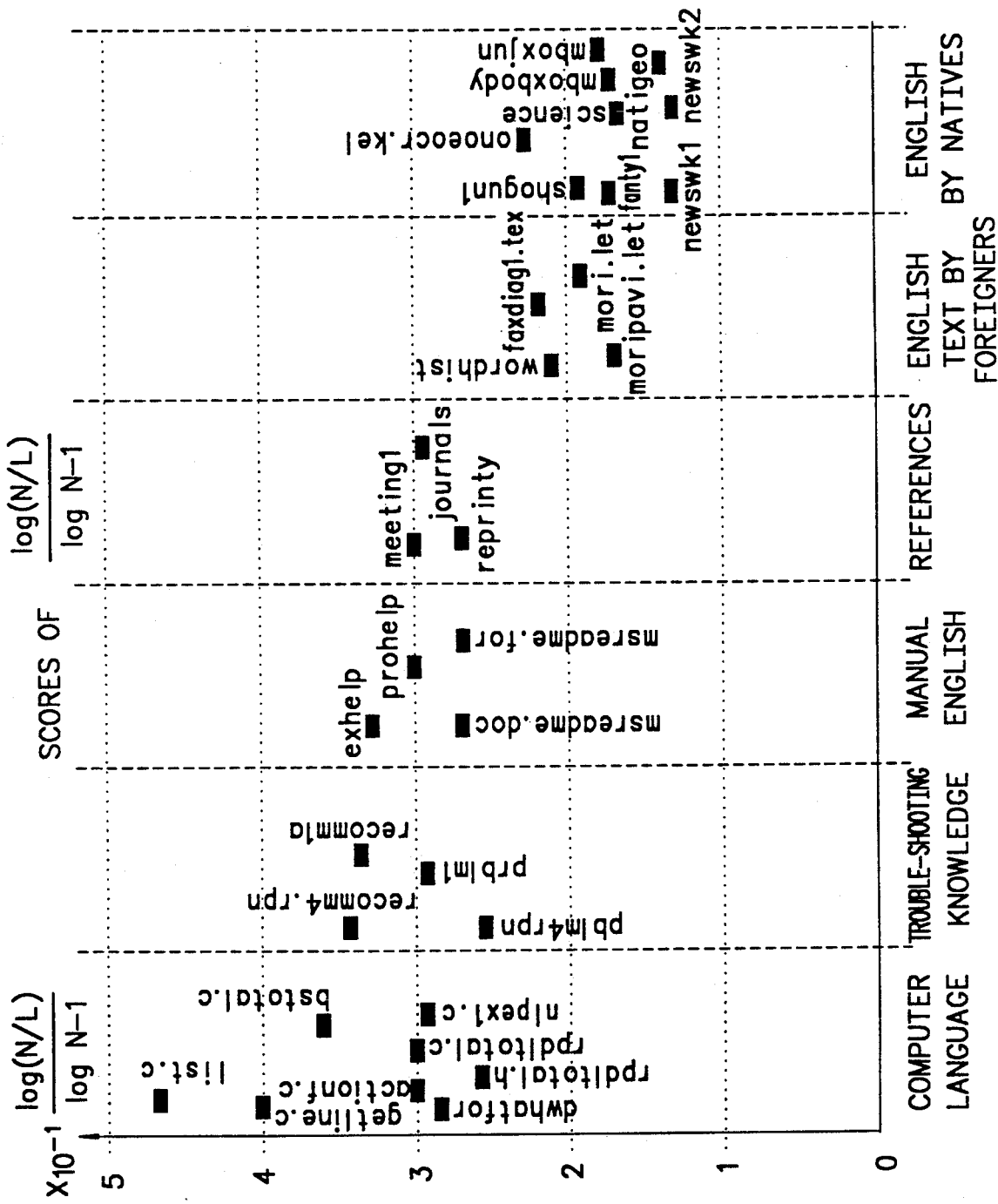
FIG. 5 Plotting of G measure for various text categories; computer language (c code if expressed as *.c, fortran code *.for and macro code *.h), trouble shooting knowledge (trouble shooting knowledge description for facsimiles and copiers), manual English (user-help description for expert system and technical manual for c and fortran compilers), reference (on-line reference data for IC sensors), English texts written by foreigners (all are written by Ricoh (Japan) employees), English by natives (Ricoh U.S. employee's technical reports, novel, editorial pages of Science magazine, lo Newsweek, National Geographic and e-mail message body delivered to the authors.

Expression (11) defines 'G' and it also says that G is constant. From the plot of Japanese text data in FIG. (4), this relation also seems to apply for Japanese texts. Here, the Japanese texts are phonetic representations using alphabet (ASCII string). Segmentation into words had been done by the author. Table-5 and FIG. 5 summarize the result of this calculation.

TEXT CONSTRAINT MEASURE

As we mentioned earlier, FIG. 2 implies that slope of a line has some relation to the type of text. It is clear that the world expressed in the text becomes larger in the order:

(c); computer language

→(t); trouble shooting knowledge description for facsimile

→(m); computer software manual

→(f); foreigner English text

→(n); native's English text.

We could call this ordering as 'constraint order'. Although, constraint does not have a rigorous definition, our data suggest that the diversity of the world, expressed by the texts, is inversely proportional to constraint.

From FIG. 5, we see the following tendencies.

(a). Highly constrained languages, like a computer language, tend to have a larger G, compared to the less constrained English texts.

Comments in the code have been included in the G calculation.

(b). Usual English articles have a lower 'G' score.

In spite of the fact that the world represented by natural English is enormously large compared to computer languages or manuals, the scores of English used in human communication (text by natives or foreigners in FIG. 5) are sometimes very close to other groups. This can be explained as follows Natural English has another parameter, grammar. With this addition people can communicate with many delicate expressions which other languages (computer language or manual English) poorly possess. The G measure excludes this contribution.

Further investigation has been carried on to find other text-content dependent parameters. Some promising results are obtained using correlation coefficient between "logarithm of word frequency rank order" and "word length". The correlation coefficient R is defined as follows:

$$r = \frac{\Sigma (X * Y)}{(\Sigma (X ** Y) * \Sigma (Y ** 2))^{\frac{1}{2}}} \quad (12)$$

where, ** means power operation. X and Y are deviations from the mean of word length and logarithm of word frequency rank, respectively; $X = x - <\text{mean of } x>$, [Kennedy]. Table-6 shows the "slope" determined by linear regression model and its "correlation coefficient" [Kennedy]. Table 6.

CONCLUSION

A measure 'G' $(=\log(N/L)/(\log(N)-1))$ is a good measure of the constraint of the text. If 'G' becomes larger, the text is more constrained. Combined with G, a new measure 'R', correlation coefficient defined by (12), can classify the texts more efficiently as shown in Table-6.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Figure 6A:
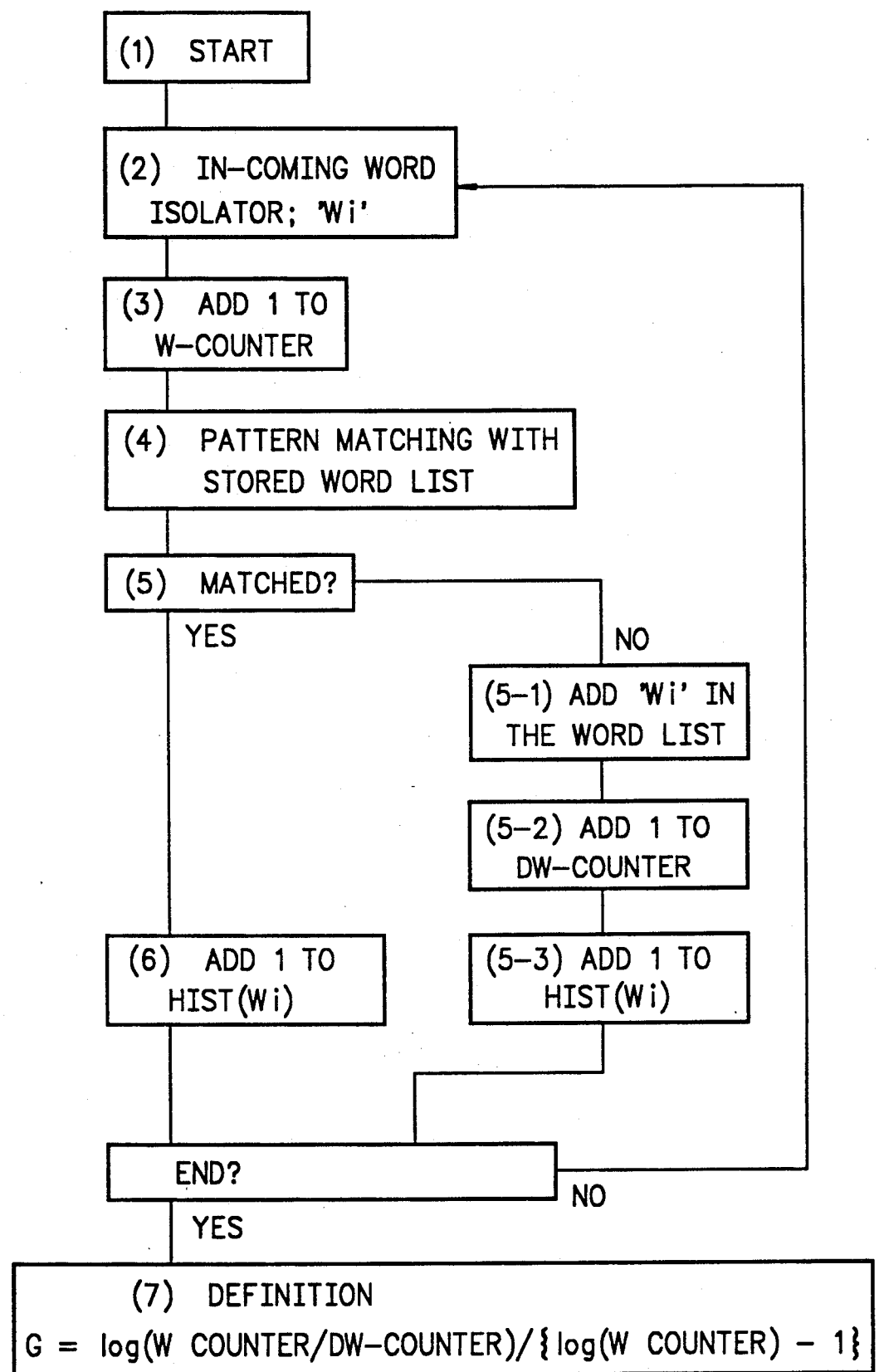

The general flow of this invention is disclosed in FIGS. 6(a) and 6(b), whereall the processes are realized by software.

In process (2), in-coming text are separated word by word. The separators of the word are 'blank' ", '/', 'period', 'comma' and various kind of bracket and symbols defined above as <dividers>. We denote the incoming word "Wi", where i is the suffix to identify the order of the word.

The process (3) is the simple adder which only increment one ateach occurrence. The parameter W-COUNTER is the incoming word count.

In (4), the incoming word is compared with the already stored WORD LIST. Here, WORD LIST stores all the incoming ASCII strings. If no stored words match the incoming word, the current word is added into the stored WORD LIST (5-1).

Then, the counter DW-COUNTER is incremented where a number of different word is counted (5-2).

Then, at (5-3), a counter HIST(Wi) is incremented. It shows the number (histogram) of words whose spelling is "Wi".

Step (6) is the same as (5-3); histogram counter of word "Wi".

If incoming text ends, go down to step (7), if not go up to the step (2).

Step (7) defines the parameter "G". One of the key parameter to classify the text.

At step (8), histogram HIST(Wi) is sorted to be ordered from the maximum number to the minimum. The ordered histogram is called HIST ORDER(Wj).

Step (9) defines a lot of parameters to be used at the next step. This step is repeated until HIST ORDER(Wj) goes down to less than 3. It means that all the parameters are counted up while HIST ORDER(Wj) is greater than or equal to 3.0. "n sample" is the total number counter. Here, s length is an operator which calculates the length of the "Wj", * is a multiplier and ** is a power operator.

At step (10), another important parameter "R" is defined. "sqrt" is an operator to give the value of square root.

Figure 8:
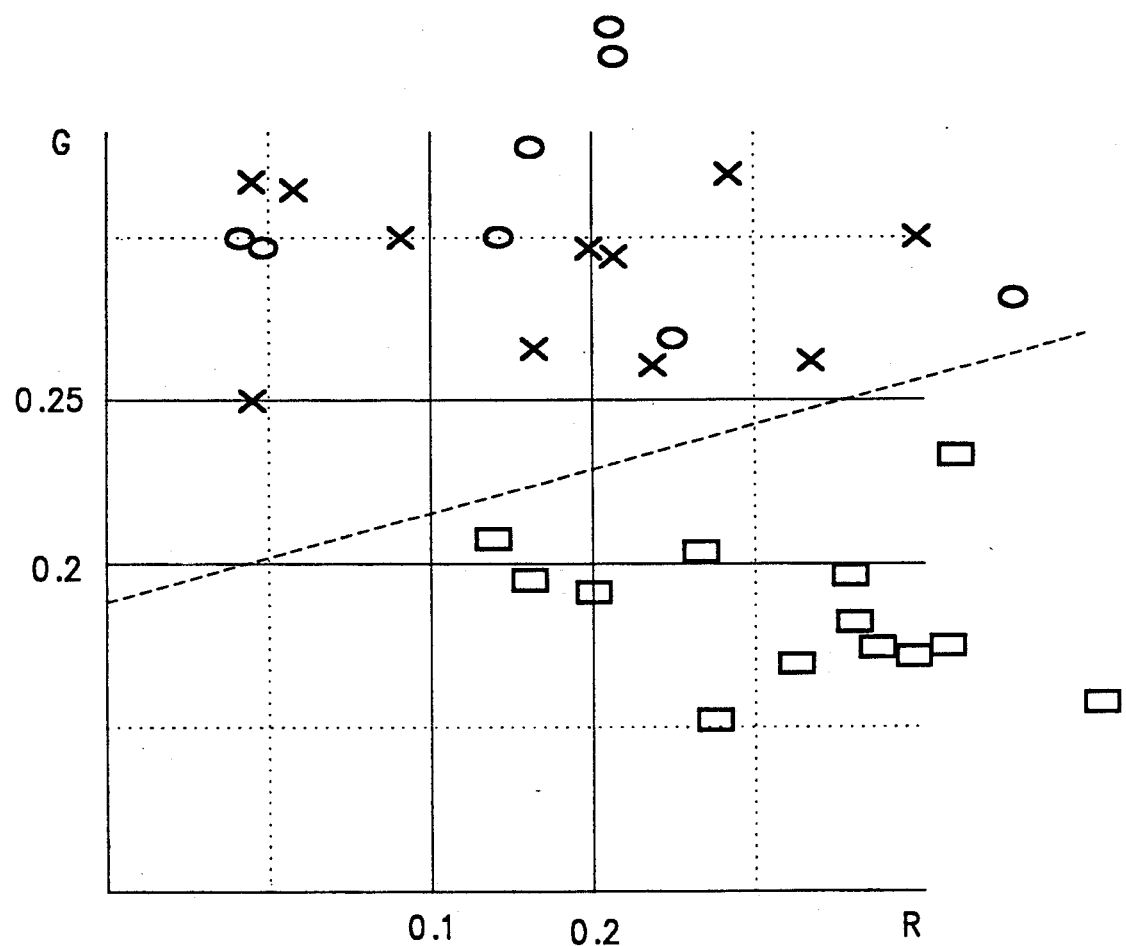
FIG. 8 depicts a classification of English text, non-English text, and computer language.

At the final step (11), the target text is classified as follows (see FIG. 8).

(a) If $G < 0.18 + 0.13 * R$
then
"the text may be normal English"
(b) Else
"the text may be constrained English" or "non-English."

Figure 7:
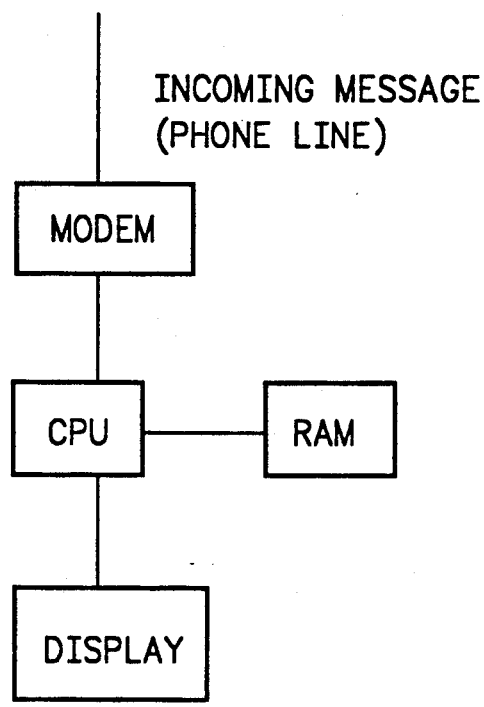
FIG. 7 depicts one example of on-line text classification system. The incoming texts are processed by CPU with RAM (random access memory) table used to store the WORD__LIST explained in FIG. 6.

FIG. 7 shows one of the example for on-line text retrieval system. A CPU ca access the large data file (not exhibited) through MODEM and whole the text set is scanned. The CPU proceed as described above. In this processing, WORD LIST which sometimes exceed 2000 entries are temporarily stored in the RAM, normally attached to CPU systems. The results are shown on a DISPLAY.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

REFERENCES

[Booth]; Booth, A. D. "A law of Occurrences for Words of Low Frequency", Information and Control, 10(4); 386-393 (1967)

[Kennedy]; Kennedy, J; Neville, A; "Basic Statistical Method for Engineers and Scientists", pp 407, Harper and Row Publishers Inc (1986).

[Mizutani]; Mizutani, S; "Lecture on Japanese", Asakura, Tokyo, 1983

[Tankard]; Tankard, J; "The literary detective", Byte 1986, February, pp. 231

[Zipf]; Zipf, G. K. "The psycho-biology of language", The MIT Press (1965), Originally printed by Houghton Mifflin Co. 1935 Nicolis, J.; "Dynamics of Hierarchical Systems", Springer-Verlag, Berlin 1956

What is claimed is:

1. A text classification method for use in a text classification system having first, second, and third counts, the method comprising the steps of
   isolating incoming text by separating the incoming text into incoming words,
   incrementing said first count for each incoming word,
   comparing each incoming word with a first stored word list to determine if the incoming word matches with a stored word,
   adding the incoming word to the first stored list if there is no match and incrementing said second count,
   comparing each incoming word with a second stored word list to determine if the incoming word matches with a stored word and if there is no match, adding the incoming word to the second stored word list,
   incrementing said third count,
   determining a first constant by a ratio of said first count to said second count and determining a second constant by a ratio of said third count to said first count, and
   determining the text classification by the value of said first and second constants.

2. A text classification apparatus for use in a text classification system having first, second and third counts, the apparatus comprising
   means for storing a word list,
   means for isolating incoming text by separating the incoming text into incoming words,
   means for incrementing said first count for each incoming word,
   means for comparing each incoming word with a first stored word list to determine if the incoming word matches with a stored word,
   means for adding the incoming word to the first stored list if there is no match and incrementing said second count,
   means for comparing each incoming word with a second stored word list to determine if the incoming word matches with a stored word and if there is no match, adding the incoming word to the second stored word list,
   means for incrementing said third count,
   means for determining a first constant by a ratio of said first count to said second count and determining a second constant by a ratio of said third count to said first count, and means for determining the text classification by the value of said first and second constants.

3. The apparatus as in claim 2 wherein the text is English text.

4. The apparatus as in claim 3 wherein the first count has a value of 1000.

5. The apparatus as in claim 4 wherein the text classification is determined to be computer language if said first constant (C) is greater than 5 and said second constant (R) is less than 20.

6. The apparatus as in claim 5 wherein the text classification is determined to be manual if said first constant (C) is greater than 4 and said second constant is greater than 10.

7. The apparatus as in claim 6 wherein the text classification is determined to be English text written by a native English speaker if said first constant is less than 2.5 and said second constant is greater than 50.

8. The apparatus as in claim 7 wherein the text classification is determined to be English text written by a non-native English speaker if said first constant (C) is greater than 2.5 and less than 3, and said second constant is greater than 50.

9. A text classification method for use in an English text classification system having first, second and third counts, the method comprising the steps of isolating incoming text by separating the incoming text into incoming words, incrementing said first count for each incoming word, comparing each incoming word with a first stored word list to determine if the incoming word matches with a stored word, adding the incoming word to the first stored list if there is no match an incrementing said second count, comparing each incoming word with a second stored word list to determine if the incoming word matches with a stored word, and if there is no match, adding the incoming word to the second stored word list, incrementing said third count, determining the English text classification by the value of said first and second constants wherein the text classification is computer language, manual, English text written by a native English speaker or English text written by a non-native English speaker.

10. A text classification method for use in a text classification system having first and second counts, the method comprising the steps of isolating incoming text by separating the incoming text into incoming words, incrementing said first count for each incoming word, a first comparing step for comparing each incoming word with a first stored word list to determine if the incoming word matches with a stored word, adding the incoming word to the first stored list if there is no match and incrementing said second count, a second comparing step for comparing each incoming word with a second stored word list to determine if the incoming word matches with a stored word and if there is no match, adding the incoming word to the second stored word list, and wherein said second comparing step increments a third count, and further including the steps of determining a first constant by a ratio of said first count to said second count and determining a second constant by a ratio of said third count to said first count, and determining the text classification by the value of said first and second constants.

11. A text classification apparatus for use in a text classification system having first and second counts, the apparatus comprising means for storing a word list, means for isolating incoming text by separating the incoming text into incoming words, means for incrementing said first count for each incoming word, first comparing means for comparing each incoming word with a first stored word list to determine if the incoming word matches with a stored word, means for adding the incoming word to the first stored list if there is no match and incrementing said second count, and second comparing means for comparing each incoming word with a second stored word and if there is no match, adding the incoming word to the second stored word list, and wherein said second comparing means for comparing increments a third count, and further including means for determining a first constant by a ratio of said first count to said second count and determining a second constant by a ratio of said third count to said first count, and means for determining the text classification by the value of said first and second constants.

* * * * *